Aug. 25, 1936.   W. G. VAN VOORHIS ET AL   2,052,372
PIPE LINE UNCOVERING MEANS
Filed July 25, 1935   4 Sheets-Sheet 4
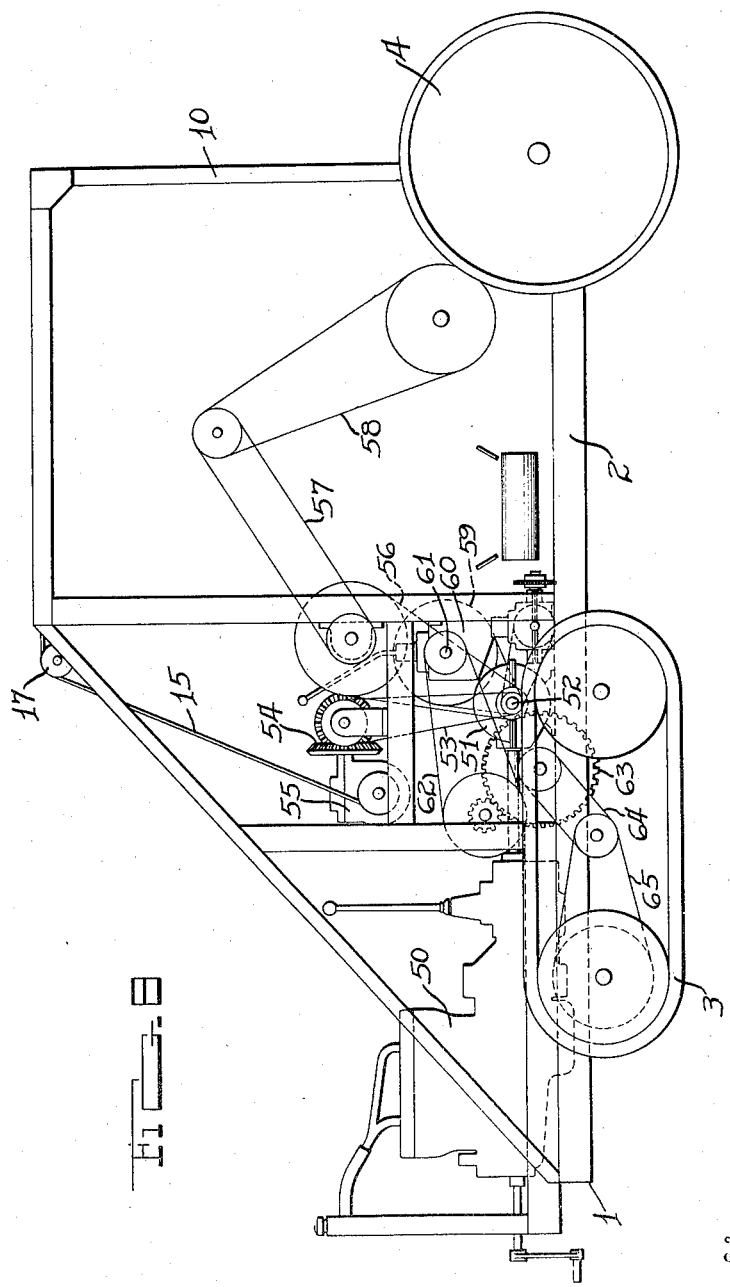
Inventor
William G. Van Voorhis
Charles F. Yocum
By Owen & Owen Attorneys Patented Aug. 25, 1936

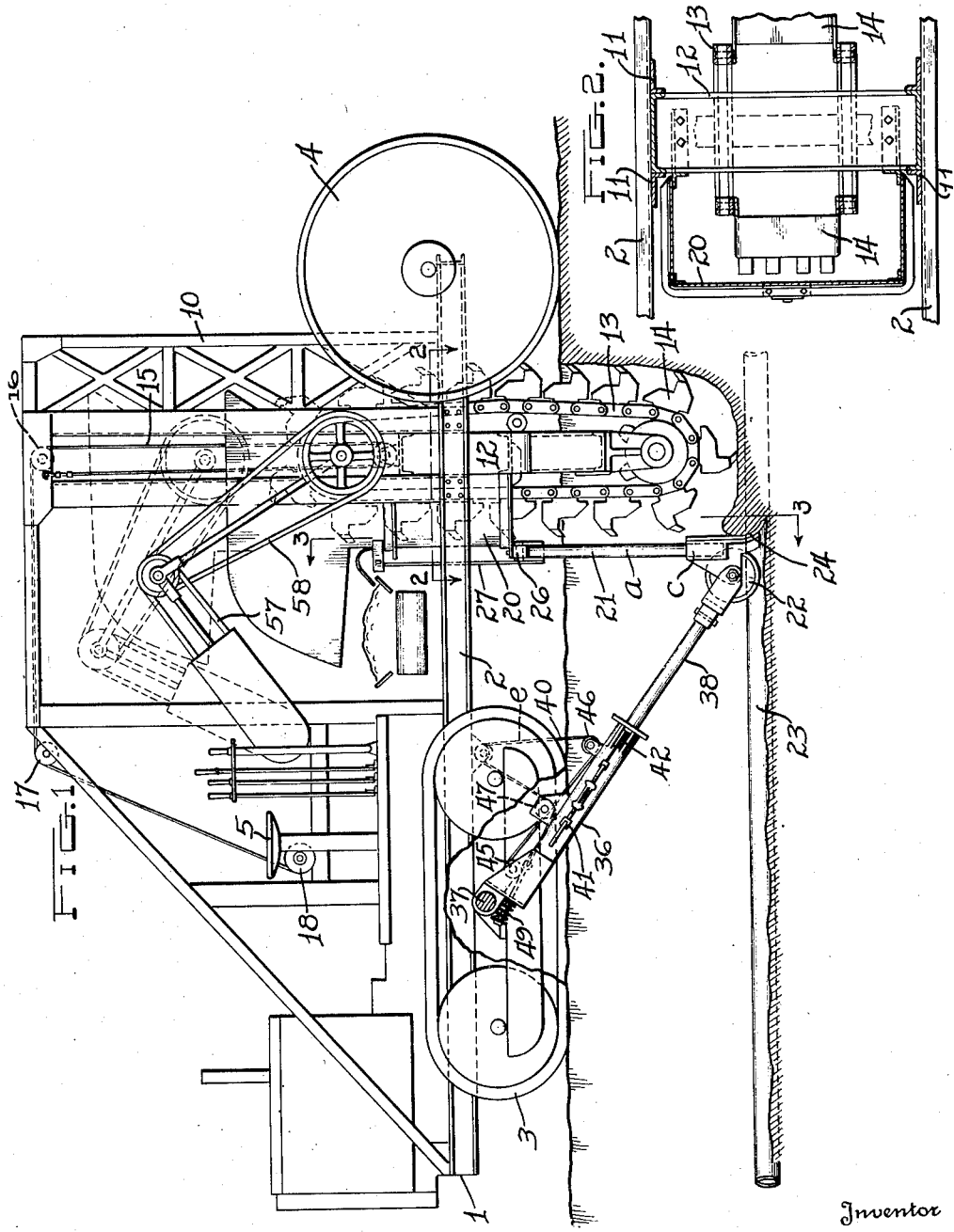

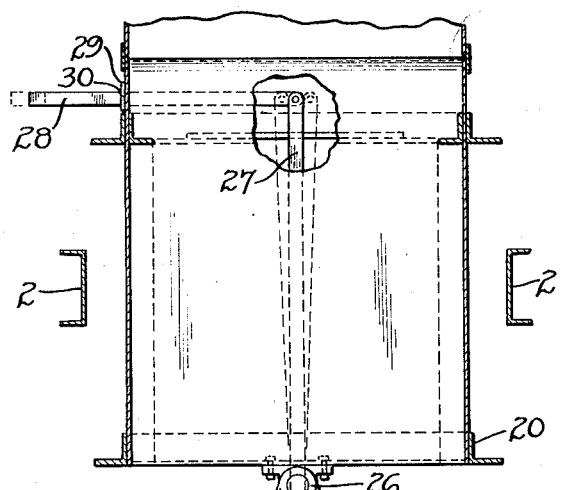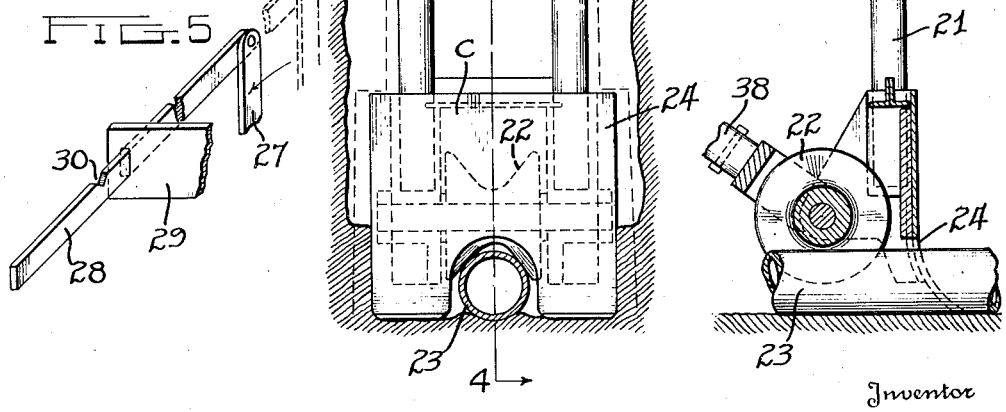

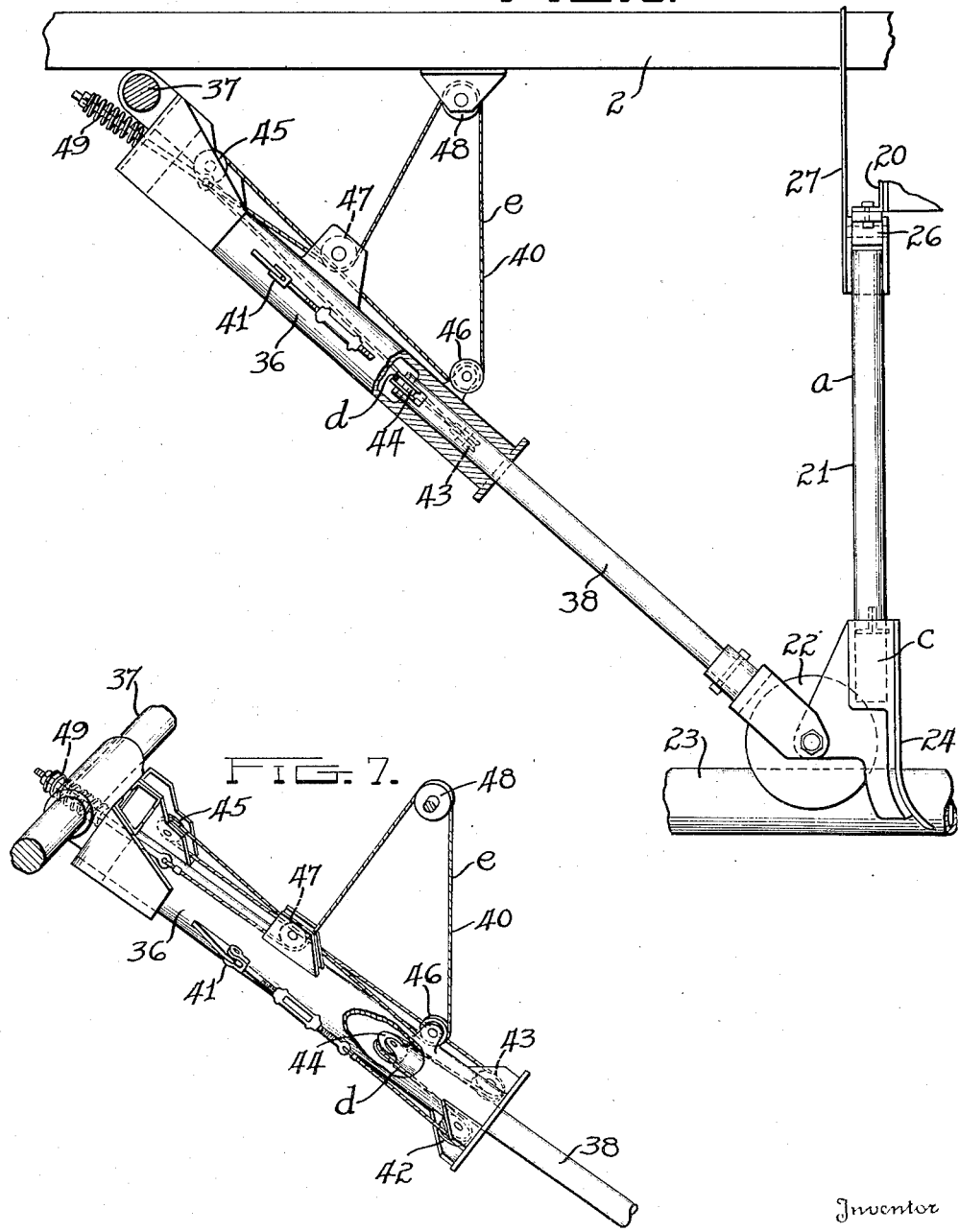

2,052,372

UNITED STATES PATENT OFFICE 2,052,372

PIPE LINE UNCOVERING MEANS

William G. Van Voorhis and Charles F. Yocum, Findlay, Ohio, assignors to The Buckeye Traction Ditcher Company, Findlay, Ohio, a corporation of Ohio Application July 25, 1935, Serial No. 33,192

20 Claims. (Cl. 37—83)

This invention relates to excavating machines, and particularly to a machine for uncovering buried pipe lines to facilitate removal, repair, inspection or replacement of such lines.

The primary object of the invention is the provision of a machine of this character which will rapidly, efficiently and economically uncover a buried pipe line by excavating a trench over and at the sides of such line.

A further object of the invention is the provision of means in connection with such a machine for enabling an operator to accurately follow the unmarked course of a pipe line no matter how irregular or sinuous it may be.

Further objects and advantages of the invention will be apparent from the following detailed description thereof, and from the accompanying drawings, illustrating one embodiment of the invention, in which—

Figure 1 is a side elevation, partly in diagram, of a machine embodying the invention in operative uncovering relation to a pipe line, and with parts broken away; Fig. 2 is an enlarged fragmentary section on the line 2—2 in Fig. 1; Fig. 3 is an enlarged fragmentary section on the line 3—3 in Fig. 1; Fig. 4 is an enlarged fragmentary section on the line 4—4 in Fig. 3; Fig. 5 is a fragmentary perspective detail of the side member of the direction indicating means; Fig. 6 is a detailed enlarged side elevation of the automatically adjustable plow bracing means, with parts broken away; Fig. 7 is a perspective detail of a part of said bracing means; and Fig. 8 is a more or less diagrammatical side elevation of the machine illustrating the transmission of power to the various parts and with the excavating means removed.

Referring to the drawings, 1 designates the main frame of the machine which includes the longitudinally extending laterally spaced side sill members 2, and which is supported at the rear by suitable tractor means 3 preferably of the apron wheel type, and at the front end by steering wheels 4. The wheels 3 and 4 of the respective sets are disposed at opposite sides of the frame, the steering wheels being controlled by any suitable steering means (not shown), as is common in the art, and the tractor wheels being driven from an engine or other suitable power source on the frame, as is common and well understood in the art. The operator's seat 5 is on the rear end portion of the frame convenient to the various controls.

The front end portion of the frame 2 is provided with a super-frame 10 having vertical guides 11, in the present instance of angle iron, rising from the inner sides of the side sills 2 in connection with the super-frame 10 and forming vertical guide means for the boom frame 12. The boom frame carries endless bucket chains 13 having excavating buckets 14 and passing around guide members at the top and bottom of the boom in a manner well understod in the art. The excavating means formed by the boom 12 and chain of buckets 14 is disposed intermediate the traction means 3 and steering wheels 4 preferably adjacent to the latter, as indicated in Fig. 1. The raising and lowering of the boom frame 12 is controlled by a cable 15, which has one end anchored to the top of the super-frame 10, thence extends down under a sheave on the upper end of the frame 12, thence upward over a top sheave 16 and rearwardly over a sheave 17 at the upper rear portion of the frame 10 and thence down around a power drum 18, which is driven in either direction in any suitable manner, as well understood in the art.

The boom frame 12 is provided near its top with a rearward extension 20 from the lower rear edge of which depends a plow frame 21, which carries at its lower end a peripherally curved guide wheel 22 for straddling and traveling on a pipe line 23 to be uncovered. The plow frame 21 also carries at its lower end a plow 24 in advance of the guide wheel 22. This plow is of forked form to adapt it to straddle the pipe line 23 and to excavate a desired depth at each side thereof, as indicated in the drawings, the fork members preferably being curved forwardly to present cutting noses to facilitate excavation.

The plow frame, in the present instance, comprises a pair of vertically disposed laterally spaced parallel bars a, a, connected at their tops by a cross member b and at their bottoms by a casting c, which latter is forked to carry the guide wheel 22 and is also adapted to have the plow plate 24 attached to its forward side. The frame 21 and guide wheel 22, when the latter is traveling on the top of a pipe line 23, provides a support for the boom frame 12, so as to maintain the lower reach of the excavating buckets quite close to the top of the pipe line, but suitably spaced therefrom to prevent striking the pipe line joints which occur at intervals therealong. It is apparent that any rising or falling of the plow frame 21, due to the guide wheel 22 following the irregular top surface of the pipe line will be followed by a corresponding movement of the boom frame and main excavating means. It is also apparent that as the machine advances, the bucket excavating means first acts on the soil to effect an excavation of a trench over the pipe line to near the top surface thereof and that the plow 24 immediately follows to excavate the portion of the soil remaining over the pipe line and also the portions to a desired depth at the sides of the line, the soil which is plowed up being forced forward or piled up in advance of the plow in position to be picked up and removed by the buckets 14. For this purpose, the plate 24 is of suitable height and is substantially the same in width as the trench cut by the excavating buckets.

Ordinarily there are no markers on the surface to indicate the course of a pipe line, and it is therefore important to provide some means by which the operator may determine the sinuous or irregular course of a pipe line so that the travel of the machine and the excavation of the trench may be gauged accordingly. For this purpose, the steering wheels 4 are preferably placed in advance of the excavating means so that the latter has a trailing action with respect thereto and the plow frame 21 has its upper end pivotally connected to the rearward extension 20 of the boom frame, as shown at 26, with its pivotal axis disposed longitudinally of the main frame so that the plow frame may have swinging movements transverse thereto and of a trench being excavated. It is thus apparent that as the course of a pipe line 23 is shifted laterally one way or the other, the guide wheel 22 riding on the pipe line causes a corresponding shifting of the lower end of the plow frame. For the purpose of indicating this shifting movement to the operator, the plow frame 21 has an arm 27 rigidly projecting upward from its upper end so as to rock therewith, and pivotally connected to and projecting laterally from the upper end of this arm is a sight bar 28. The bar 28 at a point in convenient view of the operator passes freely through an aperture in a guide member 29 on the frame extension 20 and is provided with a notch or other visible marker point 30 adjacent to the guide member 29. It will thus be seen that any swinging of the plow frame 21 in either direction from normal vertical position will be indicated by a movement of the notch 30 in one direction or the other relative to the stationary guide 29, thus enabling the operator to steer the course of the machine accordingly.

It is found desirable and quite important in practice to brace the lower end of the plow frame 22 against rearward movements relative to the bucket excavating means occasioned by the plow striking some rigid obstruction in its travel. It is necessary, however, to do this in a manner not to interfere with the free vertical movements of the plow which effect a lengthening or shortening of the bracing means. In other words, it is necessary to provide a bracing means which offers a constant resistance to a rearward movement of the plow relative to the main frame and which at the same time compensates for a lengthening or shortening of the bracing means due to an angular movement thereof upon a raising or lowering of the plow.

To accomplish this, a cable 40 is provided which has various looped connection with sheaves on the bracing members 36, 38, and main frame 1. This cable, see particularly Fig. 7, is anchored at one end to the member 36 at a point 41, then passes down to the lower end of such member and passes crosswise thereof under respective sheaves 42 and 43 disposed at opposite sides of the member 38 and with the portion of the cable therebetween forming a loop $d$ which passes around a sheave 44 on the inner end of the member 38. The cable, after leaving the sheave 43, passes lengthwise of the member 36 to the upper end thereof around a sheave 45 thereon and thence back to near the forward end of said member around a sheave 46 and then back again under the sheave 47 which is intermediate the sheaves 46 and 45, the portion of the cable between the sheaves 46 and 47 forming a loop $e$ which passes around a superposed sheave 48 attached to the frame 1. The cable, after passing under the sheave 47, extends to the upper outer end of the member 36 and is anchored thereto through an intermediate compression spring 49. It is apparent that a lengthening of either loop $d$ or $e$ necessarily effects a shortening of the other loop, so that any movement in one loop is compensated for by a movement in the other loop.

From the foregoing, it will be seen that the cable 40 constantly acts on the two bracing members 36 and 38 to resist an inward telescoping movement thereof or a shortening of the brace, except when the loop $e$ is shortened by an upward swinging of the plow end of the brace, in which event the loop $d$ is lengthened a suitable extent to permit a shortening of the brace sufficiently to compensate for the different angular position of the brace relative to the machine frame. The connection between the brace and axle 37 is sufficiently free to permit any necessary lateral swinging of the brace necessary to permit the plow to follow any horizontal deflection or curvature of the pipe line being acted on.

While various means may be employed for transmitting power to the various driven parts, as is well understood in the art, the power means illustrated, as shown in Fig. 8, comprises a motor 50 mounted on the rear end of the machine frame and having its shaft entering a gear case 51 and in driving connection therein with a transversely disposed shaft 52. This shaft has a belt and pulley driving connection 53 with a gearing 54 which in turn communicates power through a gearing disposed in the case 55 to the shaft carrying the drum 18 on which the boom hoisting cable 15 winds. The shaft 52 also communicates power to the endless bucket chain 13 through various sets of belt, pulley and shaft connections 56, 57, and 58. The connections 57 and 58 are of the jointed type, as indicated in Fig. 1, so as not to interfere with vertical movements of the boom frame 12. The shaft 52 is also connected through a belt and pulley drive 59 and a transmission mechanism disposed within a case 60 to a shaft 61, which has a drive connection which drives the tractor means 3 through a belt and pulley connection 62, gearing 63 and two sets of belt and pulley connections 64 and 65. It will be understood that the power connections shown and described are merely illustrative of one manner of driving the various driven parts of the machine.

It is apparent that we have provided a machine for rapidly and efficiently excavating the soil from over and at the sides of a pipe line; that it permits the operator to accurately follow the irregular course of a buried pipe line; that the plow is continually braced against rearward movement relative to the machine and at the same time is permitted to rise and fall together with the main excavating means to suit the depth of the pipe line being operated on.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. In a machine of the class described, a vertically movable means for excavating a trench over a buried pipe line, a support for said means having a grooved roller traveling on an exposed pipe line in trailing relation to said means and coacting with the pipe line to guide the course of the support.

2. In a machine of the class described, a vertically adjustable boom frame, an endless chain of excavating buckets carried by the boom and operable to excavate a trench over a buried pipe line, a support for the boom frame having a member at its lower end adapted to travel on an exposed pipe line in trailing relation to the excavating action of said buckets and to coact with the pipe line to guide the course of the support.

3. In a machine of the class described, a vertically movable excavating means for excavating a trench over a buried pipe line, a support for said means adapted to travel on an exposed pipe line in trailing relation to the excavating means, and a plow carried by said support cooperating with the excavating means to remove soil from over and at the sides of the pipe line.

4. In a machine of the class described, a vertically movable excavating means for excavating a trench over a buried pipe line, means for traveling on the exposed portion of a pipe line in trailing relation to the excavating means and forming a support therefor which maintains the excavating means in predetermined spaced relation to the pipe line, and a plow carried by the supporting means for removing soil from immediately over the top and at the sides of the pipe line.

5. In a machine of the class described, excavating means including a vertically movable boom frame and an endless chain of excavating buckets carried thereby, a support for said boom frame having provision at its lower end for resting on an exposed portion of a pipe line being uncovered by said excavating means and also having means for removing a predetermined amount of soil from around the pipe line in trailing relation to said first means, and means for constantly bracing said support against rearward movement relative to the excavating means without interfering with its vertical movements.

6. In a machine of the class described, a vertically movable main excavating means, including a boom frame and a chain of excavating buckets operatively carried thereby and adapted to excavate a trench over a buried pipe line, a support for said boom frame adapted to ride on the exposed portion of a pipe line in trailing relation to said excavating means and having a plow member for straddling a pipe line and acting on the soil immediately over and at the sides of the pipe line and moving it into position to be acted on by said excavating means, and constant bracing means for the plow end of the support adapted to permit vertical movements thereof.

7. In a machine of the class described, vertically movable means for excavating a trench over a buried pipe line, a support for said means trailing the same and riding on an exposed portion of the pipe line to maintain said means in predetermined relation to the pipe line, said support being laterally movable to follow curvatures in the pipe line, and means actuated by lateral movements of said support to indicate the course of the pipe line.

8. In a machine of the class described, vertically movable means for excavating a trench over a buried pipe line, a lateral swingable support for said means adapted to ride on an exposed portion of a pipe line in trailing relation to said means, and means connected to the support and operable by a lateral swinging movement thereof to indicate the course of the pipe line.

9. In a machine of the class described, a vertically movable means operable to excavate a trench over a buried pipe line, a support for said means riding on an exposed portion of a pipe line in trailing relation to the means and laterally movable relative to said means to follow the irregular course of a pipe line, a sight member, and means connecting said support and sight means to cause lateral movements of the former to communicate predetermined direction indicating movements to the latter.

10. In a machine of the class described, vertically movable means for excavating a trench over a buried pipe line, means adapted to ride on an exposed portion of the pipe line in trailing relation to said first means and to maintain said first means in predetermined relation to the pipe line and to cooperate therewith to remove soil from around the pipe line, said supporting means being laterally movable relative to the first means to follow the irregular course of the pipe line, and direction finding means connected to and actuated by lateral movements of said supporting means.

11. In a machine of the class described, a main frame, guide means at the forward end of the frame, tractor means for the frame spaced rearwardly from said guide means, excavating means mounted for vertical movements in said frame intermediate said guide and tractor means and operable to excavate a trench over a buried pipe line, means supporting said excavating means and adapted to ride on the exposed portion of a pipe line in trailing relation to such means, and a plow carried by said support in straddling relation to the associated pipe line and cooperating with the excavating means to remove the soil a predetermined extent from around the pipe line.

12. In a machine of the class described, a tractor frame, tractor means associated therewith, steering wheels supporting the frame in advance of the tractor means, excavating means carried for vertical movements by the frame between said tractor means and steering wheels and operable to excavate a trench over a buried pipe line, a trailing support for the excavating means adapted to ride on an exposed portion of an associated pipe line, said support being laterally movable relative to the excavating means, and direction indicating means connected to and operable by lateral movements of said support.

13. In a machine of the class described, a main frame, an excavating means guided for vertical movements in said frame and adapted to excavate a trench over a buried pipe line, a trailing support for said excavating means including a plow feature, a rear sectional brace for said support connected to the frame for vertical movements with the support, and means acting on the sections of the brace to constantly resist a rearward movement of the support and to compensate for angular movements of the brace upon raising and lowering movements of the support.

14. In a machine of the class described, a frame, vertically movable means mounted therein and adapted to excavate a trench over a buried pipe line, a trailing support for said means adapted to maintain it in predetermined relation to an associated pipe line, a sectional brace connecting the frame and lower end of said support to resist rearward movements of the latter, and cable and sheave means connecting the sections of said brace and said frame and operable to constantly resist a rearward movement of said support and to compensate for a variance in the length of the brace occasioned by vertical movements of the support relative to the frame.

15. In a machine of the class described, a portable frame, a plow element suspended therefrom for vertical adjusting movements, a brace for said element pivotally connected at one end thereto and at its other end to the frame, said brace including two telescoping sections and a compensating means connecting said sections and frame, said latter means including a cable attached at its ends to one of said sections and having intermediate portions in looped engagement with an end of said other section and with a part of said frame, said cable serving to resist any relative inward movement of the sections except when the plow element is vertically moved and then only in compensating relation to such movement.

16. In a machine of the class described, a main frame, an excavating member suspended from and vertically movable relative to the frame, a sectional brace pivotally connected at one end to said means and at its other end to the frame, and means acting on the sections of the brace to constantly resist a rearward movement of the excavating means and to compensate for angular movements of the brace upon raising and lowering movements of the excavating means.

17. In a machine of the class described, means for riding on a pipe line and being laterally movable to follow the curvature in such line, and means actuated by lateral movements of said first means to indicate the course of the pipe line to the machine operator.

18. In a machine of the class described, means for riding on a pipe line and laterally swingable to follow curvatures in the line, and means actuated by the swinging movements of said first means to indicate the course of the pipe line to the machine operator.

19. In a machine of the class described, vertically movable means for excavating a trench over a buried pipe line, means trailing said excavating means and riding on an exposed portion of the pipe line, said trailing means being laterally movable to follow curvatures in the pipe line, and means actuated by lateral movements of said trailing means to indicate the course of the pipe line.

20. In a machine of the class described, means for excavating a trench over a buried pipe line, means trailing said excavating means for effecting a further excavation of soil over and around the pipe line and adapted to ride on the pipe line, said trailing means being laterally swingable to follow curvatures in the pipe line, and means actuated by lateral movements of the trailing means to indicate the course of the pipe line.

WILLIAM G. VAN VOORHIS.
CHARLES F. YOCUM.